United States Patent [19]

Chang et al.

[11] Patent Number: 5,408,274
[45] Date of Patent: Apr. 18, 1995

[54] METHOD AND APPARATUS FOR COMPOSITING COMPRESSED VIDEO DATA

[75] Inventors: Shih-Fu Chang, Albany; David Messerschmitt, Moraga; Wen-Lung Chen, San Jose, all of Calif.

[73] Assignee: The Regents of the University of California, Berkeley, Calif.

[21] Appl. No.: 29,435

[22] Filed: Mar. 11, 1993

[51] Int. Cl.$^6$ .................... H04N 7/133; H04N 7/137
[52] U.S. Cl. ................... 348/700; 348/699; 348/407; 348/584
[58] Field of Search ............ 358/183, 136, 450, 451, 358/181; 11/160, 93, 95; 348/580, 581, 584, 586, 578, 407, 699, 700; H04N 7/133, 7/137

[56] References Cited

U.S. PATENT DOCUMENTS

| | | | |
|---|---|---|---|
| 4,282,546 | 8/1981 | Reitmeier | 358/183 |
| 4,602,286 | 7/1986 | Keller et al. | 358/183 |
| 5,077,610 | 12/1991 | Searby et al. | 358/93 |
| 5,140,416 | 8/1992 | Tinkler | 358/95 |
| 5,196,934 | 3/1993 | Fleischman et al. | 358/160 |
| 5,229,855 | 7/1993 | Siara | 358/181 |
| 5,245,432 | 9/1993 | Jaffray et al. | 358/160 |
| 5,247,372 | 9/1993 | Tsutamori et al. | 358/450 |

OTHER PUBLICATIONS

Lee, "Transform Domain Filtering Based on Pipelining Structure", IEEE Transactions on Signal Processing, vol. 40, No. 8 (Aug. 1992).
CCITT—Recommendation H.261, Video Codec for Audiovisual Services at Pk64 Kbit/s (1990).
MPEG—Standard Draft, MPEG Video Committee Draft, MPEG 901/176 Rev. 2, Dec. 1990.
IPEG Standard Draft, IPEG-9-R7 (Feb. 1991).

*Primary Examiner*—Tommy P. Chin
*Assistant Examiner*—Vu Le
*Attorney, Agent, or Firm*—Flehr, Hohbach, Test, Albritton & Herbert

[57] ABSTRACT

Inverse motion compensating devices are used to transform motion compensated transform domain video signals to corresponding transform domain video signals. A compositing mechanism receives the transform domain video signals from the inverse motion compensating devices and performs transform domain video compositing operations directly on the transform domain video signals. The compositing operations result in a single composited signal incorporating each of the transform domain video signals. The single composited signal may be encoded for motion compensation to generate a single motion compensated transform domain video signal suitable for transmission. After transmission, inverse transform domain operations and inverse motion compensation operations may be performed to reconstruct the composited signal. The composited signal may then be projected on a video display device.

22 Claims, 9 Drawing Sheets

$$\begin{bmatrix} y(i) \\ y(i+1) \\ y(i+2) \\ \cdot \\ \cdot \\ y(i+N-1) \end{bmatrix} = \begin{bmatrix} h(-l_1)\ldots\vert\ .h(0)\ldots\ldots\vert .h(l_2) \\ h(-l_1)\ldots\vert.h(0)\ldots\ldots\vert.h(l_2) \\ h(-l_1)..\vert.h(0)\ldots\ldots\vert.h(l_2) \\ \vert\ \cdot\ \vert \\ \vert\ \cdot\ \vert \\ h(-l_1)..\vert.h(0)\ldots\ldots\vert h(l_2) \end{bmatrix} \begin{bmatrix} x(i) \\ x(i+1) \\ x(i+2) \\ \cdot \\ \cdot \\ x(i+N-1) \end{bmatrix}$$

$H = (\ H^{-1}\quad H^0\quad H^1)$

Figure 14

METHOD AND APPARATUS FOR COMPOSITING COMPRESSED VIDEO DATA

BRIEF DESCRIPTION OF THE INVENTION

The present invention relates generally to the processing of video signals. More particularly, the present invention relates to a method and apparatus wherein multiple video signals, each in a compressed format, are combined in the compressed format to render a single composited scene.

BACKGROUND OF THE INVENTION

Video compositing is the process of combining multiple video signals, originating from different sources, to produce a single composited scene. Video compositing is commonly performed in multipoint video conferencing, video editing, and multimedia applications.

Typical video compositing operations include processing of individual video objects by general geometrical transformation or filtering, or combining multiple video objects by opaque or semi-transparent overlap. In general, video objects are semi-transparent, arbitrarily-shaped, and arbitrarily-positioned. Different compositing operations have different complexity. Most applications only implement a subset of the compositing operations.

For network video applications, video compositing can be implemented at different locations, including the video source sites, intermediate nodes within or outside networks, and users' display sites. Although video compositing can be implemented in the uncompressed spatial domain, where operations are performed pixel by pixel, most video data transmitted through networks, or stored in video servers, is represented in some compressed format. Therefore, it would be desirable to perform video compositing operations on data which is still in a compressed format.

Many video applications utilize data compression. More particularly, many video applications utilize transform code compressed domain formats (referred to herein as "transform domain" formats), which include the Discrete Cosine Transform (DCT) format, the interframe predictive code format, such as the Motion Compensation (MC) algorithm, which may be used in conjunction with the DCT format, and hybrid compressed formats. The DCT format is used in the compression standard for still images JPEG (Standard Draft, JPEG-9-R7, Feb. 1991). The combination of Motion Compensation and Discrete Cosine Transform compression algorithm (MC/DCT) is used in a number of standards including: the compression standard for motion pictures (MPEG—standard Draft, MPEG Video Committee Draft, MPEG 90/176 Rev. 2, Dec. 1990), the standard for video conferencing (CCITT—Recommendation H.261, Video Codec for Audiovisual Services at px64 kbits/s), and some High Definition Television proposals.

Figure 1:
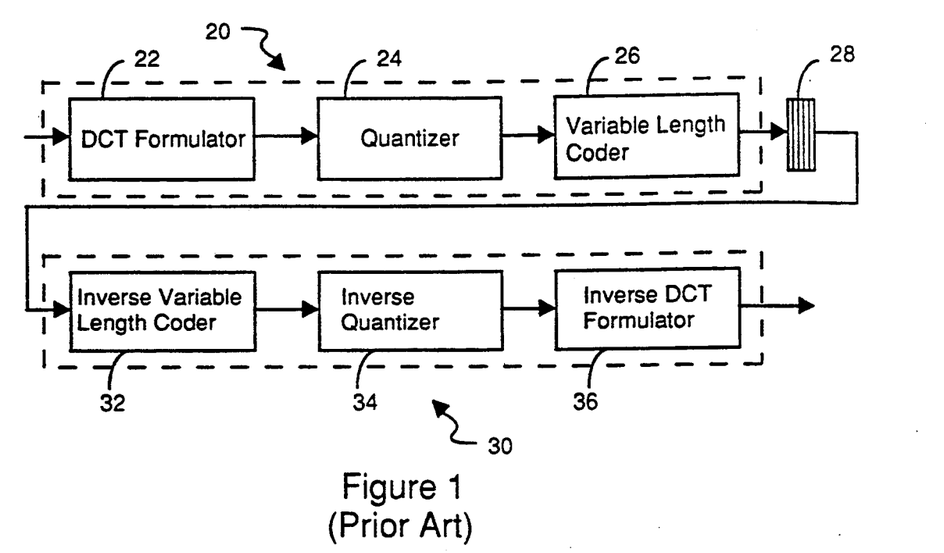
FIG. 1 depicts the prior art signal processing associated with the Discrete Cosine Transform.

FIG. 1 is a block diagram depicting the processing associated with the DCT format. At the encoder 20, the DCT format is established by DCT formulator 22. Specifically, the video data is segmented into blocks of data, or pixel blocks, which can be represented by an $N \times N$ matrix, which is referred to as "A". The matrix A of video input data can be transformed to the DCT domain through the following operation:

$$A_c = CAC^T$$

where $C(i,j) =$ for $i = 0$ and $$\frac{1}{\sqrt{N}}$$

$$\sqrt{\frac{2}{N}} \cos \frac{\pi(2j + 1)i}{2N}$$

for $i \neq 0$.

The $C^T$ term refers to the transposition of the C matrix, such that the columns of C become rows in $C^T$ and the rows in C become the columns in $C^T$. The elements $A_c(i,j)$ represent the spectrum of the original image block, A, at different spatial frequencies. Elements with larger index values represent the higher-frequency components.

Typically, the DCT coefficients $A_c(i,j)$ are then quantized at quantizer 24. That is, the individual coefficients of the resultant $N \times N$ matrix are each transformed to a finite number of bits. Usually, the number of bits is a function of the rate and quality requirement of the video service.

Typically, the quantized values are further encoded by the variable length coder 26, which often includes a run-length coding function and an entropy coding function. The run-length coding function uses a single bit length to represent a long run of zero values. The entropy coding function assigns longer bit patterns to samples with a higher probability of occurrence, and shorter bit patterns to samples with a lower probability of occurrence. Consequently, the overall average data amount can be reduced. The variable length coded data is then conveyed to transmission channel 28.

As depicted in FIG. 1, inverse operations are performed at decoder 30 to return to an uncompressed domain. In particular, inverse variable length coding is performed by inverse variable length coder 32, an inverse quantization step is performed by inverse quantizer 34, and an inverse DCT operation is performed by inverse DCT formulator 36. This processing results in the original uncompressed video data.

Usually, the DCT-compressed video signal has much less data than the original spatially uncompressed video signal. Therefore, given multiple DCT-compressed video signals, compositing directly in the DCT-compressed domain is a potentially efficient approach. That is, given DCT-compressed data input video streams, it would be desirable to directly perform compositing operations on the DCT-compressed data, without conversion to the uncompressed spatial domain. However, there are complications associated with transform domain compositing operations.

In many of the compression standards previously mentioned, the DCT algorithm is accompanied by the interframe motion compensation (MC) algorithm which exploits the temporal redundancy in the video sequence. As previously stated, this data format is referred to as MC/DCT. The MC algorithm includes two types of data: motion vector data and error prediction data.

Figure 2A:
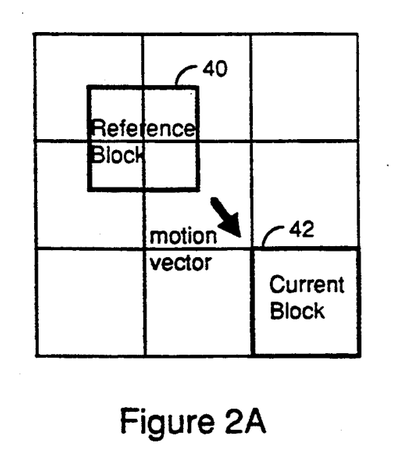
FIG. 2A depicts the relationship between a reference block and a current block for a motion compensated video signal.

The MC algorithm searches over a fixed-size area, called the motion area, and identifies the optimal reference block in a previous video frame which may be used to construct an image for a block within a present video frame. FIG. 2A depicts the location of a reference block 40 from a previous video frame which may be used to construct a current block 42 in a present frame. The motion vector defines the difference between the position of the reference block 40 and the position of the current block 42. The prediction error defines the difference in image content between the reference block and the current block.

The MC encoding process may be characterized by the following equation:

$$e(t,x,y) = P(t,x,y) - P_{rec}(t-1, x-d_x, y-d_y)$$

where e(t,x,y) is the prediction error at time t and coordinates (x,y), P is the current image block, $P_{rec}$ is the reconstructed image, and d is the motion vector.

Figure 2B:
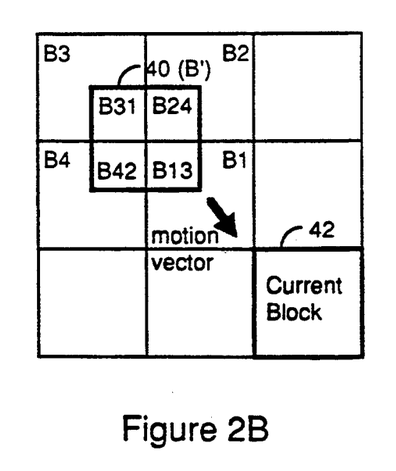
FIG. 2B depicts the problem of defining the position of a reference block when the reference block forms a portion of a number of frame blocks.

FIG. 2B illustrates that the reference block 40 may form a portion of four video blocks, namely, $B_1$, $B_2$, $B_3$, and $B_4$. The problems associated with converting such a reference block to a current block will be discussed below.

Figure 3:
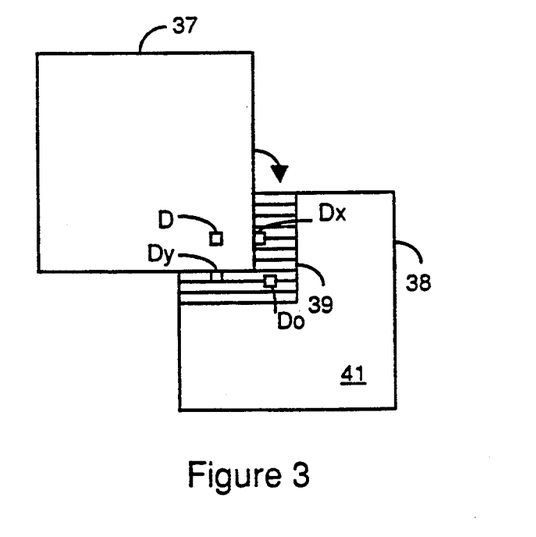
FIG. 3 illustrates a compositing problem experienced in the MC/DCT domain when part of the motion area of a background image is replaced by a foreground image.

FIG. 3 illustrates a problem associated with the MC algorithm when a foreground object 37 partially overlaps a background object 38. Assume that the foreground object is totally opaque and the block boundary positions for these two objects match. The stripped area 39 will be referred to as the "directly affected area" because part of the motion area is directly replaced by the foreground object 37. It is necessary to check every current block in the directly affected area to see if its reference block is replaced by the foreground object 37. If so, we need to recalculate the MC data, including a new motion vector and new prediction errors, of the current block. The remaining part outside the directly affected area in the background object 38 is called the "indirectly affected area" 41, because its reference clocks could be located in the "directly affected area" 39, whose MC data may need to be recalculated. In this case, the motion vector is unchanged, but the prediction errors may have minor differences.

Figure 4:
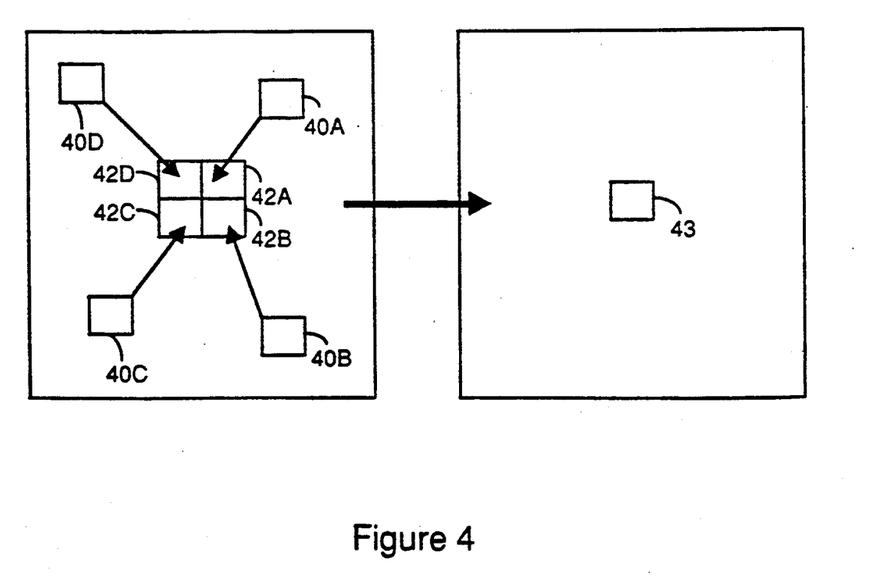
FIG. 4 illustrates a compositing problem experienced in the MC/DCT domain when scaling is performed.

Another example problem with compositing MC/DCT data relates to scaling. Suppose it is desirable to scale down an image by a ratio of 2 to 1 on each side. As shown in FIG. 4, four neighboring current blocks 42A, 42B, 42C, 42D will be scaled down to become a new block 43. Each of the four current blocks has its own reference block 40A, 40B, 40C, 40D from the previous image frame. As shown in FIG. 4, the reference blocks do not necessarily form the same 2 by 2 area as the current blocks. Thus, after the scaling operation, the reference blocks are mapped to different current blocks. Therefore, recalculation of the MC data of the new down-scaled image 43 is necessary.

As described, given MC data, including motion vector and prediction errors, for the input video signals, one is not able to calculate new MC data for the composited video signal directly. It is necessary to reconstruct the video signals back in the uncompressed spatial domain or the DCT compressed domain, perform compositing there, and calculate the new MC data for the composited video signals. As mentioned earlier, the DCT compressed domain has a lower data rate and thus potentially offers a more efficient approach than the spatial domain. However, techniques for converting video signals from the MC/DCT format to the DCT format are not known.

One skilled in the art will recognize that the recalculation of the MC data, especially searching for the reference block in the previous frame, requires more computations than the process to reconstruct the video signal from the MC data. Thus, it would be desirable to provide a method and apparatus for reducing computations associated with the recalculation of MC data.

Figure 5:
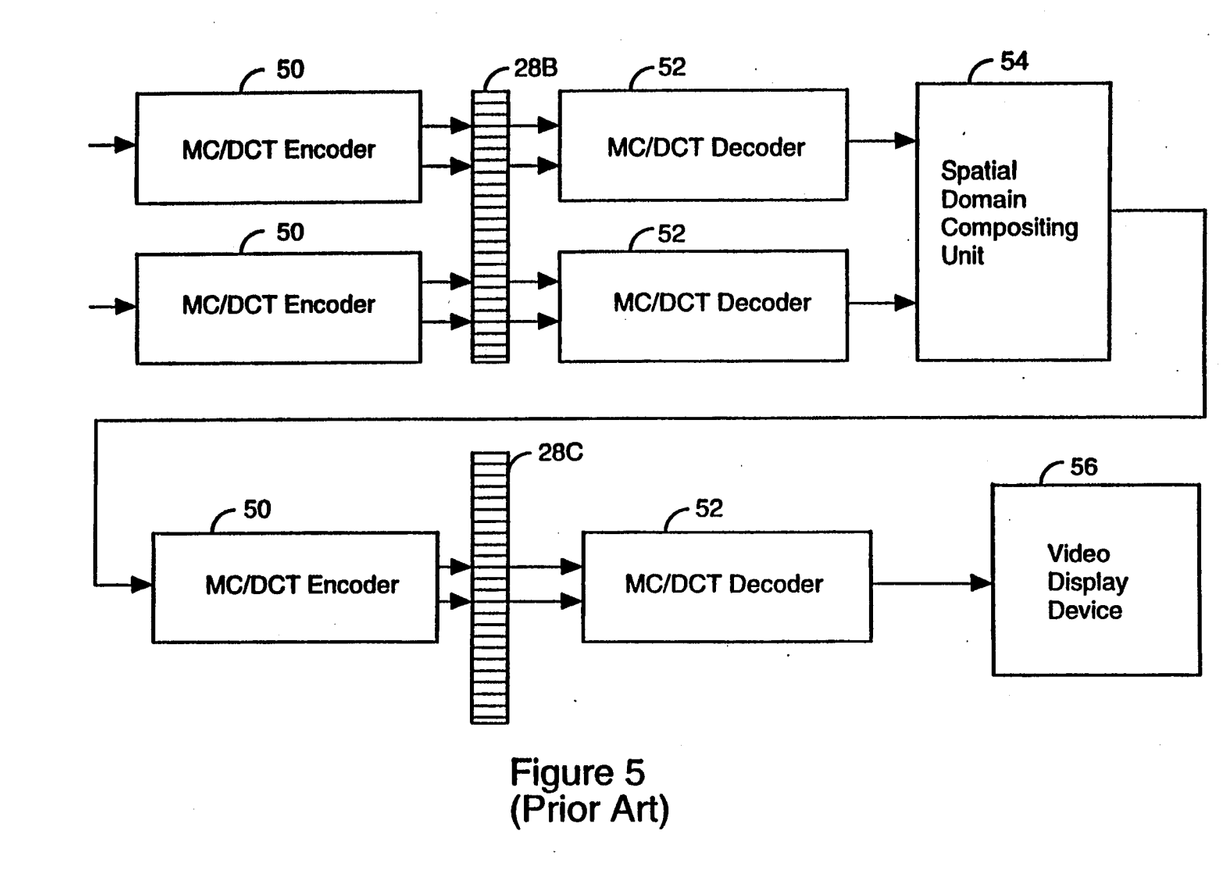
FIG. 5 depicts a prior art apparatus for compositing MC/DCT domain video data in the spatial domain.

In view of these problems, prior art MC/DCT data processing apparatus rely upon full conversion to the uncompressed spatial domain for compositing operations. One such apparatus is portrayed in FIG. 5. FIG. 5 depicts a compositing apparatus in accordance with the prior art. The figure represents that a first input video signal is conveyed to a first MC/DCT encoder 50 and a second input video signal is conveyed to a second MC/DCT encoder 50 of the same construction, as will be described below. Each MC/DCT encoder 50 produces an error signal, in the DCT compressed format, and a motion vector signal. Both signals are then conveyed over a transmission channel 28B.

After transmission, the signals are received by MC/DCT decoders 52, which will be described below. The MC/DCT decoders 52 transform the signals into the spatial domain. This is necessary, in accordance with the prior art, in order to combine, or composite, the signals. Compositing is performed by a spatial domain compositing unit 54 which performs compositing operations on a pixel by pixel basis. The output of the spatial domain compositing unit 54 is a single composited signal, incorporating the two sets of image data.

The resultant composited video signal can be displayed on a video display device at the spatial domain compositing unit 54. If the compositing unit 54 is at some intermediate node, the composited video signal must be re-transformed to the compressed format by MC/DCT encoder 50. The MC/DCT encoder 50 receives the composited signal and re-transforms it into the MC/DCT domain, thereby generating error and motion vector signals. The DCT compressed error and motion vector signals are then transmitted through transmission channel 28C. After transmission to the ultimate user destination, the error and motion vector signals are transformed into a reconstructed video signal by MC/DCT decoder 52. The reconstructed video signal is then projected on a video display device 56.

Figure 6:
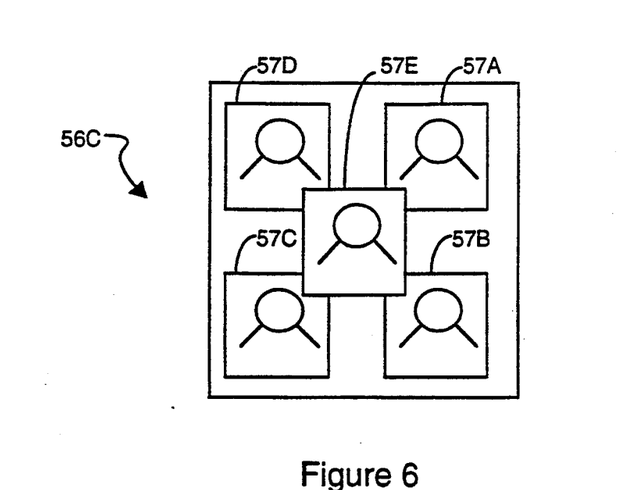
FIG. 6 depicts a video display device with a number of images composited into a single display image.

FIG. 6 depicts a video display device 56C, projecting a number of images 57, typically seen in a video conferencing application. The individual images 57A, 57B, 57C, 57D, 57E, in sum, form a single composited image.

Figure 7:
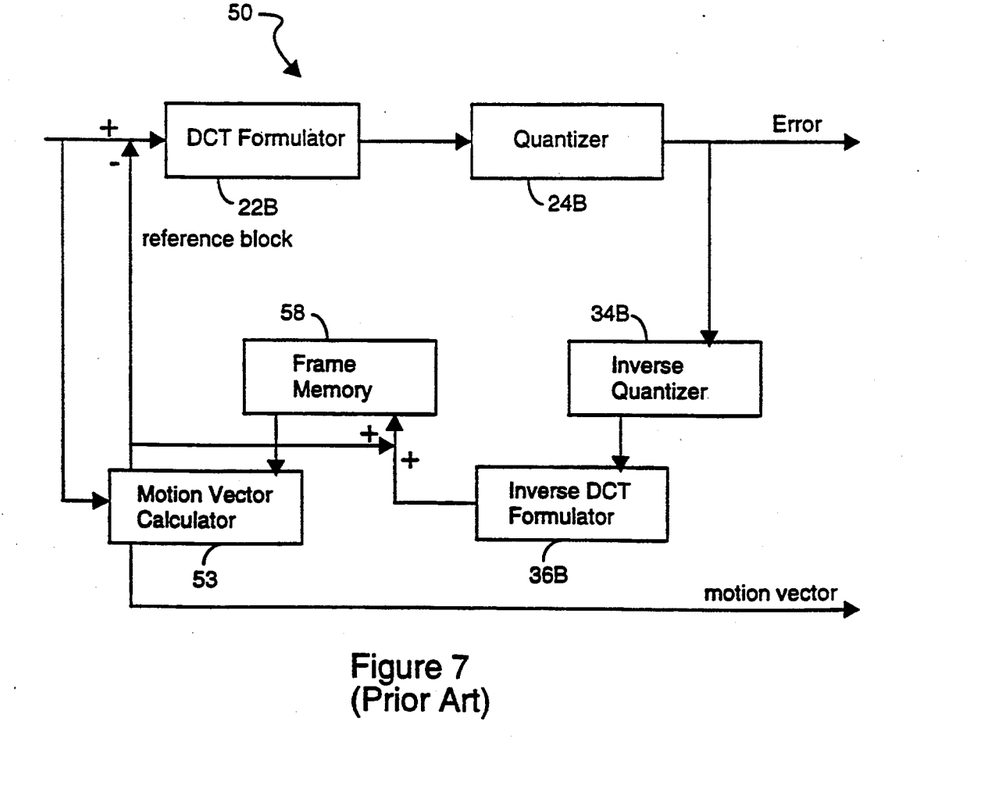
FIG. 7 depicts a prior art MC/DCT domain encoder, as employed in the apparatus of FIG. 5.

FIG. 7 depicts an MC/DCT encoder 50 in accordance with the prior art. The input video signal is conveyed to a motion vector calculator 53. The motion vector calculator 53 receives the previous frame data from frame memory 58. The motion vector calculator 53 compares the previous frame data with the present frame data to identify a reference block (as block 40 in FIG. 2A). The motion vector indicates the positional difference between the current image block and the reference image block. This motion vector forms one output of the MC/DCT encoder 50.

The motion vector calculator 53 also generates the reference image block which is subtracted from the input video frame to produce an error signal. The error signal corresponds to the difference in content between the reference block and the current block.

The error signal is conveyed to DCT formulator 22B and quantizer 24B to convert it to the DCT domain. The result of this processing is an error signal at the output of the MC/DCT encoder 50.

The error signal is also conveyed along a feedback path, as reflected in FIG. 7. In the feedback path, an inverse quantizer 34B and an inverse DCT formulator 36B are used to convert the error signal back to the spatial domain. The spatial domain error signal is then added to the previous reference block to form reconstructed video data. The reconstructed video data is conveyed to the frame memory 58 and will be used as the "previous frame" in the next frame cycle.

It should be recognized that the outputs of the MC/DCT encoder 50 may be further encoded with a variable length coder 26. For the sake of simplicity, variable length coders 26 will be omitted from future figures, although it will be appreciated that they may be used in accordance with the invention.

Figure 8:
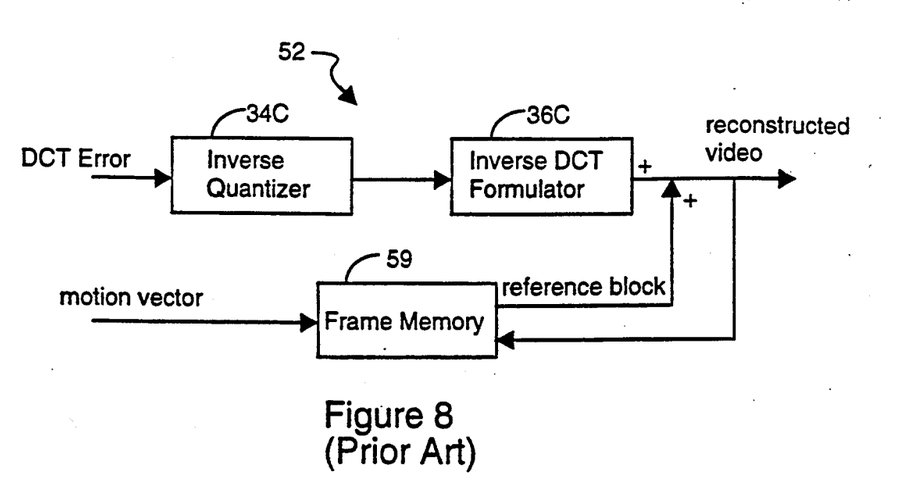
FIG. 8 depicts a prior art MC/DCT domain decoder, as employed in the apparatus of FIG. 5.

FIG. 8 depicts the operation of a MC/DCT decoder 52 in accordance with the prior art. The inputs to the MC/DCT decoder 52 are the error signal and the motion vector data. The error signal is processed by an inverse quantizer 34C and an inverse DCT formulator 36C to produce an error signal within the spatial domain. The spatial domain error signal is added with reference block data from the frame memory 59. The combination of the reference data and the spatial domain error signal result in the reconstructed video which is the output of the MC/DCT decoder 52. The reconstructed video is also conveyed to the frame memory for use in the next frame cycle.

Objects and Summary of the Invention

Thus, it is a general object of the present invention to provide an improved method and apparatus for compositing video data.

It is another object of the present invention to provide a method of compositing video data which is in a compressed format.

It is another object of the invention to reduce the computational complexity associated with the reconversion of composited video data to the MC/DCT format.

It is still another object of the invention to provide a method and apparatus for converting video signals from the MC/DCT format to the DCT format.

It is yet another object of the invention to provide a method and apparatus for reducing the computations associated with recalculation of MC data.

These and other objects are achieved by an apparatus for combining a number of video signals into a single composited video signal. Inverse motion compensating devices are used to transform motion compensated transform domain video signals to corresponding transform domain video signals. A compositing mechanism receives the transform domain video signals from the inverse motion compensating devices and performs transform domain video compositing operations directly on the transform domain video signals. The compositing operations result in a single composited signal incorporating each of the transform domain video signals. The single composited signal may be encoded for motion compensation to generate a single motion compensated transform domain video signal suitable for transmission. After transmission, inverse transform domain and inverse motion compensation operations may be performed to reconstruct the composited signal. The composited signal may then be projected on a video display device.

BRIEF DESCRIPTION OF THE DRAWINGS

For a better understanding of the nature and objects of the invention, reference should be made to the following detailed description taken in conjunction with the accompanying drawings, in which.

Like reference numerals refer to corresponding parts throughout the several views of the drawings.

DETAILED DESCRIPTION OF THE INVENTION

Figure 9:
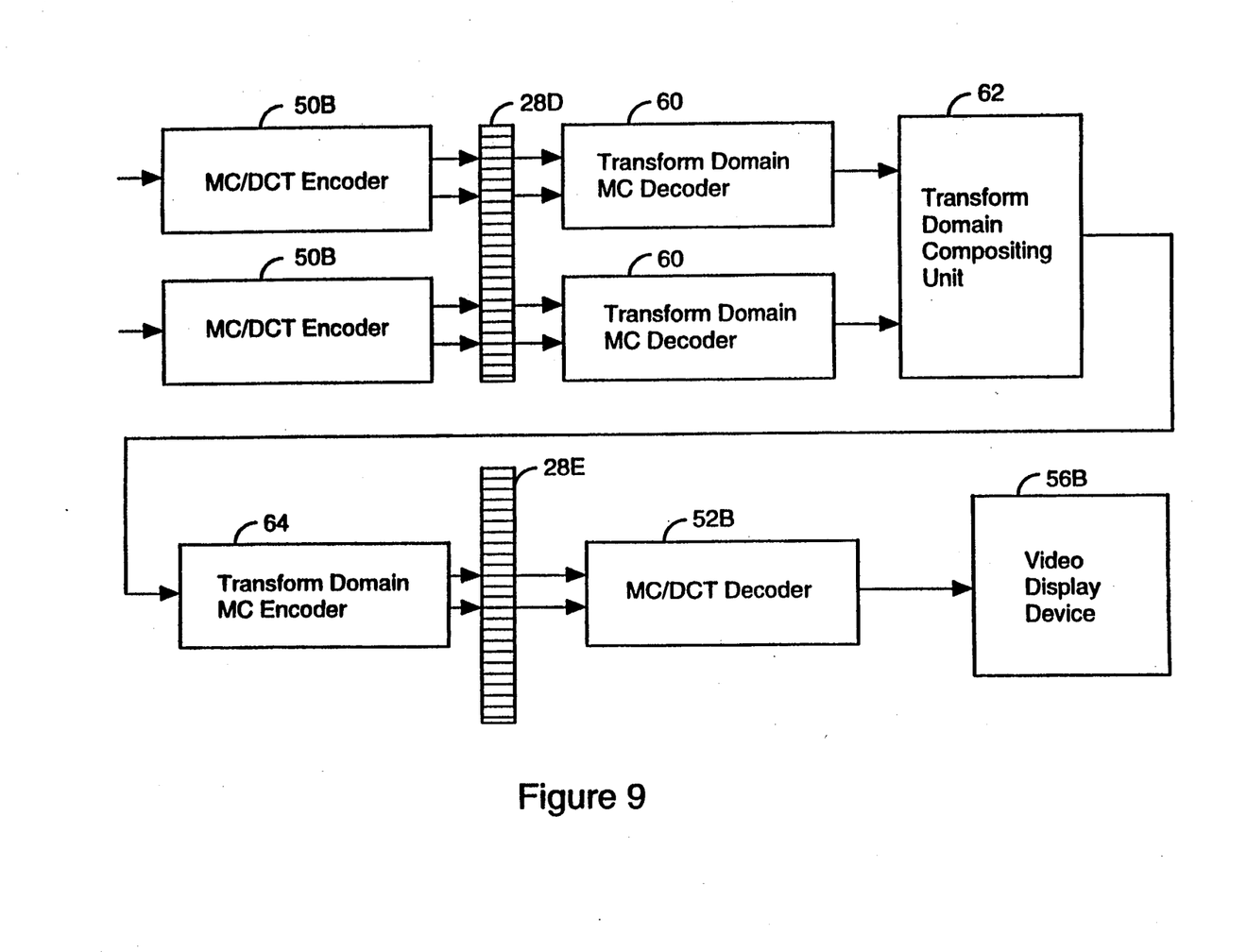
FIG. 9 depicts an apparatus, in accordance with the invention, for compositing motion compensated transform domain video signals.

FIG. 9 depicts an apparatus which may be used, in accordance with the invention, to perform compositing operations on a motion compensated transform domain video signal. The invention will be disclosed by using the MC/DCT compressed domain by way of example. However, it will be appreciated that other transform formats in conjunction with motion compensation are equally applicable to the invention. For the sake of simplicity, the invention will be disclosed by describing the compositing of two video signals. It is understood that a plurality of video signals may be processed in accordance with the invention.

FIG. 9 depicts first and second input video signals respectively being conveyed to first and second MC/DCT encoders 50B, which are of the type previously described. Each MC/DCT encoder 50B generates a DCT compressed error and motion vector signal, which is suitable for transmission over transmission channel 28D. In the prior art, the error and motion vector signals would be retransformed to the spatial domain at this juncture, prior to compositing. However, in accordance with the present invention, this step is eliminated.

Instead of a conversion from the MC/DCT domain to the spatial domain, the present invention utilizes a transform domain motion compensating (MC) decoder 60 to perform an inverse MC operation which is sufficient to avoid an inverse DCT operation and otherwise enable compositing in the DCT domain. The transform domain MC decoder 60 of the invention is disclosed in relation to FIG. 10.

Figure 10:
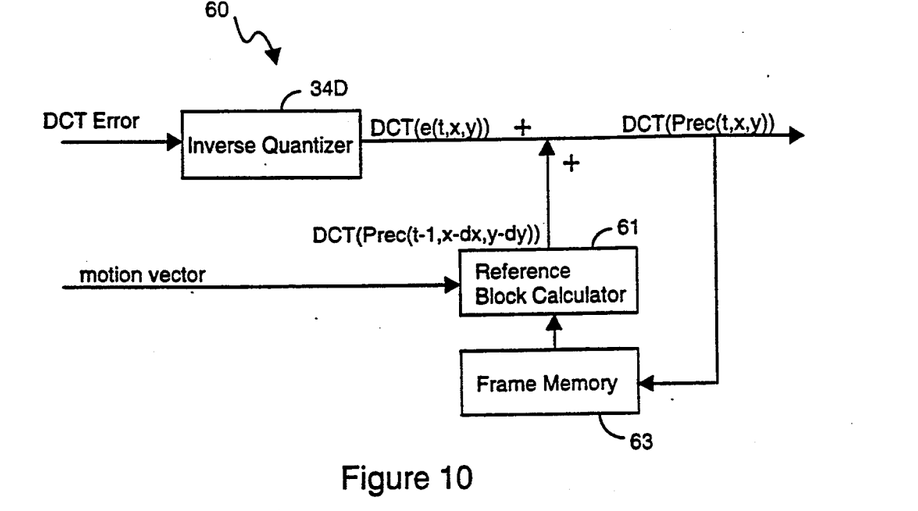
FIG. 10 depicts a transform domain motion compensating decoder which is used in the apparatus of FIG. 9.

The transform domain MC decoder of the invention includes an inverse quantizer 34D of the type previously described, a reference block calculator 61, and a frame memory 63. The inverse quantizer 34D processes the error signal. The reference block calculator 61 receives present motion vector data and reconstructed DCT data from a previous frame. The reference block calculator 61 calculates DCT data of the reference block.

Mathematically, the operation of the transform domain MC decoder 60 may be characterized by the MC transform domain decoder equation, which is defined as follows:

$$DCT(P_{rec}(t,x,y)) = DCT(e(t,x,y)) + DCT(P_{rec}(t-1, x-d_x, y-d_y))$$

$P_{rec}$ is the reconstructed image at time (t) and coordinates (x,y). The function e is the prediction error, which is described in relation to a time (t) and coordinates in an (x,y) grid. The value d in the last term of the equation is the motion vector. Note that all terms are in the DCT domain. Further, note that the inverse DCT operation is not performed.

Thus, the transform domain MC decoder 60 performs an operation wherein the DCT coefficients of the prediction error are added to the DCT coefficients of a reference image block from a former frame, as provided by the reference block calculator 61.

One problem with this approach is that the motion vector of each block is not restricted to the fixed block boundary used in the DCT algorithm. That is, the fixed block boundary of the DCT algorithm cannot always be used to identify the location of the reference block.

This problem was illustrated in reference to FIG. 2B. Note in FIG. 2B that reference block (B') 40 comprises four segments: $B_{31}$, $B_{24}$, $B_{13}$, and $B_{42}$, which are respectively positioned within four blocks: $B_3$, $B_2$, $B_1$, and $B_4$. In other words, the reference block (B') is a non-grid aligned object within the DCT grid. Thus, alignment of DCT coefficients is required.

In accordance with the invention, a method is provided wherein the DCT coefficients of a new arbitrary-position image block are derived directly from the DCT coefficients of four original neighboring blocks.

Returning to FIG. 2B, the DCT coefficients of reference block B', have contributions from four old neighboring blocks, namely the upper-left corner ($B_{13}$) of block $B_1$, the lower-left corner ($B_{24}$) of block $B_2$, the lower-right corner ($B_{31}$) of block $B_3$, and the upper-right corner ($B_{42}$) of block $B_4$. Mathematically, this is characterized as:

$$DCT(B') = DCT\begin{bmatrix} 0 & 0 \\ 0 & B_{13} \end{bmatrix} + DCT\begin{bmatrix} 0 & B_{24} \\ 0 & 0 \end{bmatrix} +$$

$$DCT\begin{bmatrix} B_{31} & 0 \\ 0 & 0 \end{bmatrix} + DCT\begin{bmatrix} 0 & 0 \\ B_{42} & 0 \end{bmatrix}$$

Note, all sub-blocks, $B_{13}$, $B_{24}$, $B_{31}$, $B_{42}$, may have a smaller size than the DCT blocks of which they form a portion: $B_1$, $B_2$, $B_3$, $B_4$. To convert each sub-block to a full dimensioned DCT block, each sub-block is augmented to a full N by N block by stuffing zero values, as will be described below.

Figure 11:
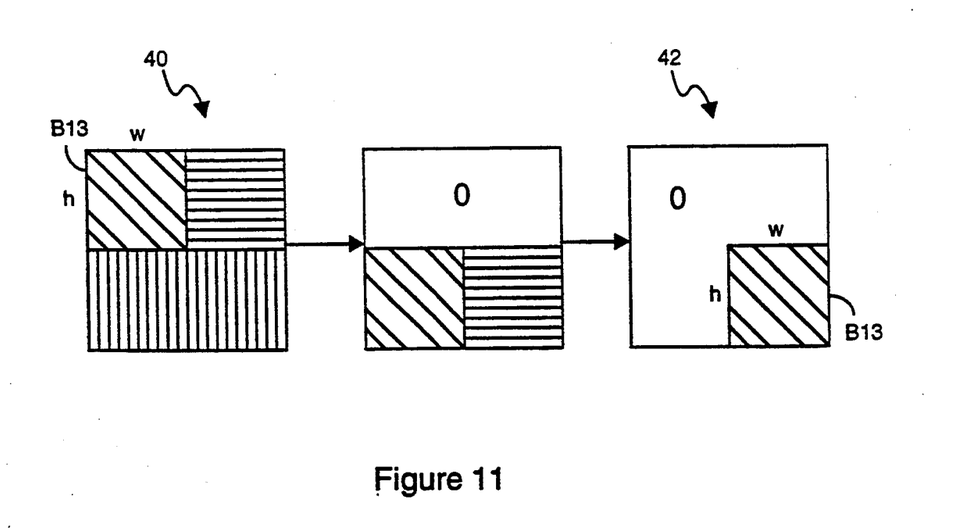
FIG. 11 depicts the translation operation which is performed in accordance with the invention.

FIG. 11 shows the movement of sub-block $B_{13}$ of old block $B_1$ to its position in reference block B' 40. Note the upper-left corner of the old block $B_1$ is extracted, supplemented by zeros, and moved to the lower-right corner. This process is necessary since the upper-left sub-block of the old block $B_1$ will appear as the lower-right sub-block of the reference block 40 (B' in FIG. 2B). This operation can be performed through the following calculation:

$$\begin{bmatrix} 0 & 0 \\ 0 & B_{13} \end{bmatrix} = H_1 B_1 H_2$$

where $$H_1 = \begin{bmatrix} 0 & 0 \\ I_h & 0 \end{bmatrix}$$

$$H_2 = \begin{bmatrix} 0 & I_w \\ 0 & 0 \end{bmatrix}$$

$I_h$ and $I_w$ are identity matrices with size $h \times h$ and $w \times w$ respectively, where h and w are number of rows and columns extracted from block $B_1$. An identity matrix is a matrix with "one" values across a diagonal of the matrix from the upper left corner to the lower right corner, with all other values being zero.

As shown in FIG. 11, multiplying $B_1$ with a pre-matrix $H_1$ extracts the first h rows and translates them to the bottom; multiplying $B_1$ with a post-matrix $H_2$ extracts the first w columns and translates them to the right.

Using the fact that DCT is distributive to matrix multiplication, we can compute the DCT of $B_{13}$ directly from the DCT of $B_1$, i.e., $$DCT\begin{bmatrix} 0 & 0 \\ 0 & B_{13} \end{bmatrix} = DCT(H_1)DCT(B_1)DCT(H_2)$$

Summing all contributions from four corners, we can obtain the DCT coefficients of the new block B' directly from the DCT of old blocks $B_1$ through $B_4$. Therefore, a transform domain translation equation is defined:

$$DCT(B') = \sum_{i=1}^{4} DCT(H_{i1})DCT(B_i)DCT(H_{i2})$$

Matrices $H_{i1}$ and $H_{i2}$ have similar structures to those of $H_1$ and $H_2$ described earlier. A sub-matrix at the lower-left corner or the upper-right corner forms an identity matrix. The DCT of $H_{i1}$ and $H_{i2}$ may be pre-computed and stored in memory, since there are a finite number of values.

The computational complexity of the DCT domain translation equation is often reduced in view of the fact that many elements of $DCT(B_i)$ are typically zeros. Since most DCT coefficients are further encoded with the run-length code, the locations of non-zero DCT coefficients can be easily found by utilizing their run-length format. If the motion vectors are zero or integral multiples of the block width, the block structure alignment procedure is not necessary. Motion compensation in the DCT domain requires simple additions only, as in the spatial domain. If one motion vector component ($d_x$ or $d_y$) is zero or integral multiples of the block width, the DCT coefficients of the new block can be computed from the DCT coefficients of only two original blocks, rather than four blocks. This results in the simplified transform domain equations:

$DCT$(new block)$=DCT(H_{11})DCT(B_1)+DCT(H_{21})DCT(B_2)$
if $d_x=0$ $DCT$(new block)$=DCT(B_1)DCT(H_{12})+DCT(B_2)DCT(H_{22})$
if $d_y=0$.

Thus, the operation of the transform domain translation equation, and its simplified analog equations, are required within the reference block calculator 61 of decoder 60. Accordingly, reference block calculator 61 may be viewed as including a transform domain translator 67 for executing the transform domain translation equation and/or the simplified transform domain translation equations. Specifically, the transform domain translation equation is used to obtain the DCT of the reference block, i.e., $DCT(P_{rec}((t-1,x-d_x,y-d_y))$.

As shown in FIG. 9, the outputs of the transform domain MC decoders 60 are conveyed to a transform domain compositing unit 62. In accordance with the invention, the transform domain compositing unit 62 provides a number of novel compositing operations which are performed on transform domain video signals. As will be further described below, the transform domain compositing unit 62 performs compositing operations directly in the transform domain. Thus, the computational overhead associated with transformation to the spatial domain is not required. In addition, since compositing operations are performed on a compressed data signal, the amount of data processing is reduced.

Figure 12:
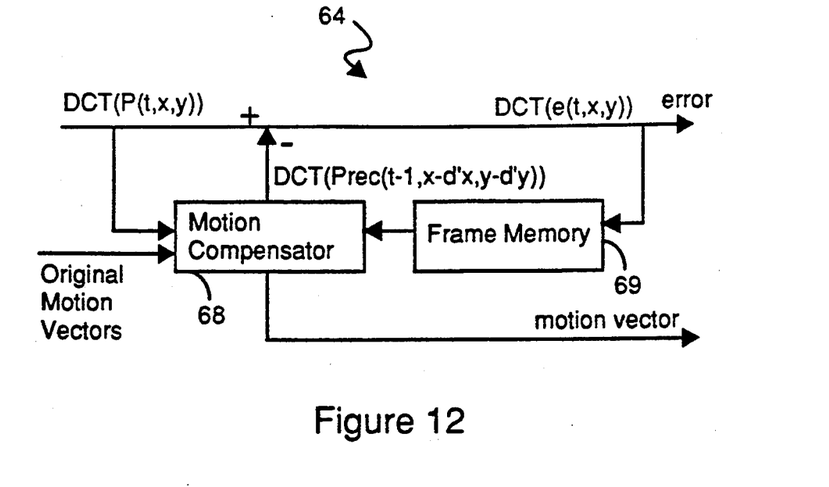
FIG. 12 depicts a transform domain motion compensating encoder which is used in the apparatus of FIG. 9.

After compositing in the DCT domain, as will be described below, the composited signal is conveyed to a transform domain MC encoder 64. FIG. 12 depicts a transform domain MC encoder 64 in accordance with the invention. The transform domain MC encoder 64 calculates the prediction error and the motion vector signal. This operation can be mathematically characterized by the transform domain MC encoder equation:

$DCT(e(t,x,y))=DCT(P(t,x,y))-DCT(P_{rec}(t-1,x-d'_x,y-d'_y))$

The variable d' is the new motion vector for the composited video sequence. As shown in FIG. 12, the motion compensator 68 identifies the new motion vector for the composited video sequence. This motion vector identifies the reference block in the previous frame, and the reference block is subtracted from the input composited signal to yield the error signal output for the encoder (DCT(e(t,x,y))). Note that a quantizer (not shown) may be used to processor the error output.

The frame memory 69 stores a previous frame value, accounting for the (t−1) value. Note, all terms in the above equation are in the DCT domain. Since the new motion vector may not be integral multiples of the block width, the transform domain translation equation may need to be executed in order to calculate DCT coefficients of the reference block ($DCT(P_{rec}(t-1,x-d'_x,y-d'_y))$).

New motion vectors d' of the composited images can be obtained by inference from the original motion vectors. This process is illustrated in reference to FIG. 3, which depicts the problem of a background image being replaced by a foreground image. $D_o$ is the location of the current block and D is the location of the original optimal reference location. The new location of the reference block can be either $D_x$, or $D_y$. As shown in FIG. 3, $D_x$ is the location of the first background block in the overlapped image horizontally displaced from the original optimal reference location D, and $D_y$ is the location of the first background block in the overlapped image vertically displaced from the original optimal reference location D. The choice of the reference block is based on the assumption that the distortion between the current block ($D_o$) and possible reference blocks increases monotonically with the difference in location between the current block and the possible reference blocks. In other words, the new reference block selected will be that block ($D_x$ or $D_y$) whose image content is closest to the current block ($D_o$). In the simplest approach, we can use the current block location ($D_o$) as the new reference block.

Returning now to FIG. 9, the error and motion vector output signals of the transform domain MC encoder 64 may be conveyed over transmission channel 28E to a standard MC/DCT decoder 52B. The output of the MC/DCT decoder 52B is a reconstructed video signal which may be displayed on video display device 56B.

Thus, a primary aspect of the present invention has been described. Namely, the operation of transform domain MC decoding and encoding of a transform domain motion compensated signal has been described. The transform domain MC decoding and encoding operations allow processing of video signals in the transform domain. Another aspect of the invention is to provide a methodology for actually performing compositing operations in the transform domain. Thus, attention presently turns to this aspect of the invention.

Figure 13:
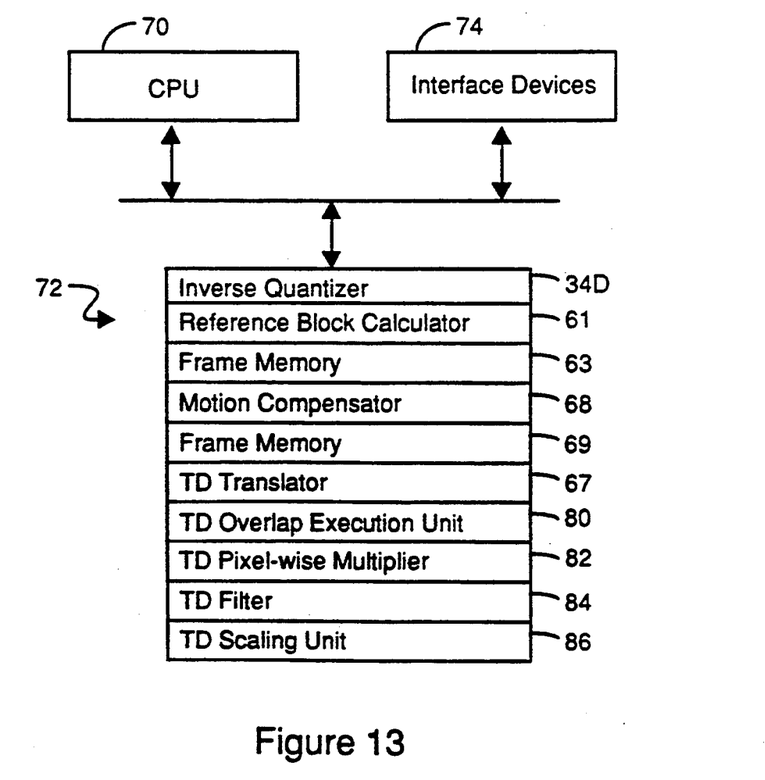
FIG. 13 depicts an apparatus for executing the functions associated with the present invention.

The transform domain compositing unit of the invention supports a number of compositing operations. In particular, the compositing unit 62 includes a transform domain translator 67, a transform domain overlap execution unit 80, a transform domain pixel-wise multiplier 82, a transform domain filter unit 84, and a transform domain scaling unit 86. These units are depicted in FIG. 13, which will be more fully described below. Note that in FIG. 13 "TD" is short for "transform domain".

The important compositing technique of translation can be achieved by using the previously described transform domain translation equation. In general, if a video object is moved a distance of an arbitrary number of pixels, the DCT coefficients of the video objects will become non-aligned with respect to the block structure used for the final display video signal. A new block of translated video signal, B', generally has contributions from four original old neighboring blocks, such as $B_1$, $B_2$, $B_3$, and $B_4$ in FIG. 2B. In order to align the DCT coefficients to the final block structure, the previously described transform domain translation equation may be used to calculate the DCT coefficients of the new video block, B'. That is, the transform domain translator 67 is used to execute the transform domain translation equation. However, in some simpler applications, translation distance may be restricted to integral multiples of the block width. In that case, the transform domain translation equation operation is not necessary. Moving a video object simply requires changing the original point position of the video object.

Another transform domain compositing function is overlapping. In the present invention, overlapping operations are performed by a transform domain overlap execution unit 80. Opaque overlapping of two video objects requires substituting pixels of the foreground video object for those of the background object. Semi-transparent overlapping requires a linear combination of the foreground and background pixels, i.e., $P_{new} = \alpha P_a + (1-\alpha) P_b$, where $P_{new}$, $P_a$, and $P_b$ are new pixels, foreground pixels and background pixels, respectively. The term $\alpha$ represents the percentage of opaqueness desired. Thus, an $\alpha$ value of 100% or (1.0) would represent an opaque overlapping operation.

Since overlapping is a linear operation, the spatial domain technique may be used in the DCT domain, specifically, a DCT domain overlapping equation may be defined as follows:

$$DCT(P_{new}) = \alpha DCT(P_a) + (1-\alpha) DCT(P_b)$$

If the $\alpha$ coefficients vary from pixel to pixel, it becomes a pixel-wise operation. An equivalent operation is pixel-multiplication, which is performed by the transform domain pixel-wise multiplier 82 of the invention. Other features requiring pixel-multiplication include subtitles, anti-aliasing for the boundaries of irregular-shaped video objects, and special-effect masking. The transform domain pixel-wise multiplier 82 executes the following equation:

$$(P_{new})_{ij} = (P_a)_{ij} * (P_b)_{ij}$$

To compute pixel-wise multiplication in the DCT domain, a multiplication-convolution relationship for the DCT is derived.

Suppose $X_c$ is the DCT of image block X. An extended symmetrical version of the DCT coefficients may be formed follows:

$$\hat{X}_c(k_1, k_2) =$$

| | |
|---|---|
| $X_c(k_1, k_2)/c(k_1, k_2)$ | $k_1, k_2 = 0, \ldots, N-1$ |
| $X_c(-k_1, k_2)/c(-k_1, k_2)$ | $k_1 = -N+1, \ldots, -1;$ |
| | $k_2 = 0, \ldots, N-1$ |
| $X_c(k_1, -k_2)/c(k_1, -k_2)$ | $k_1 = 0, \ldots N-1;$ |
| | $k_2 = -N+1, \ldots, -1$ |
| $X_c(-k_1, -k_2)/c(-k_1, -k_2)$ | $k_1, k_2 = -N+1, \ldots, -1$ |
| 0 | $k_1 = N,$ or $k_2 = N$ | where $C(k) = \dfrac{1}{\sqrt{2}}$

Then, the multiplication-convolution theorem can be described as follows:

If $y(m,n) = x(m,n) * h(m,n)$ for $m, n = 0, \ldots, N-1$, then $$\hat{Y}_c(k_1, K_2) =$$

$$\frac{1}{2N} \sum_{m,n \in [-N, N-1]} \Sigma \, [\hat{X}_c(m,n) \, \hat{H}_c(((k_1 - m))_{2N}$$

$$((k_2 - n))_{2N}]^* \alpha(k_1 - m)\alpha(k_2 - n)$$

where $k_1, k_2 = -N, \ldots, N-1$, and $\alpha(i) = 1$ when $i \in [-N, N-1]$, otherwise $\alpha(i) = -1$. Note that the syntax $((n))_N$ represents the operation of n modulo N.

If the $\alpha$ variables are ignored, the above equation is equivalent to a 2D 2N-point circular convolution. In other words, the N×N DCT coefficients of an image block are expanded to a symmetric 2N×2N extended block. The pixel-wise multiplication of two image blocks in the spatial domain corresponds to the 2-dimensional 2N-point circular convolution-like operation of the extended blocks in the DCT domain.

Another compositing technique which can be performed in the DCT domain is two-dimensional separable linear filtering. This operation is performed by transform domain filter 84.

Figure 14:
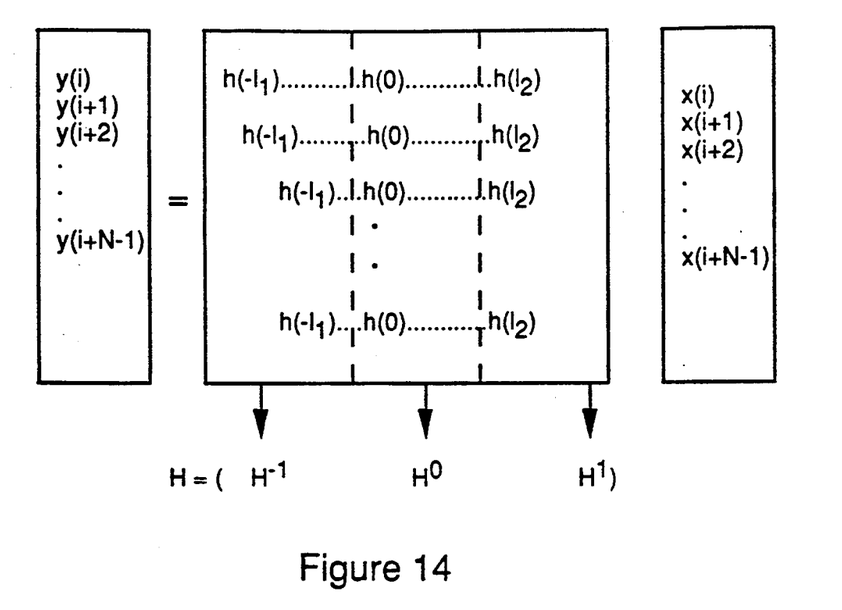
FIG. 14 illustrates the convolution operation associated with the transform domain filtering of the invention.

For simplicity, a one dimensional filter is initially described. If x[n] represents the one dimensional image sequence and h[n] represents the filter coefficient vector, then the output filtered image sequence, y[n], can be calculated as the convolution of h[n] and x[n]. Namely, $y[n] = h[n] \otimes x[n]$.

FIG. 14 assists in illustrating this process. Each element of the output vector, y[n], is the inner product of the filter coefficient vector and a corresponding segment of x[n]. If the image sequence is segmented into N-element segments, for example $x^k$ representing the kth N-element segment in the original image sequence, then the above equation can be described as the one-dimensional matrix-vector multiplication equation:

$$y^k = \sum_{j=-s1}^{Sz-1} H^j x^{k+j}$$

where $$s1 = \left[\frac{l_1}{N}\right], s2 = \left[\frac{l_2}{N}\right]$$

and $H^j$ are N×N matrices, as shown in FIG. 14. If all $H^j$ matrices are concatenated side by side to form a new matrix, H, then matrix H can be defined as:

$$H(i,j) = h \ (j - s1*N - i) \quad , \text{ if } -l_1 < = j -$$
$$s1*N - i < = l_2$$
$$= 0 \qquad\qquad\qquad , \text{ otherwise}$$

Taking the transform operation on both sides of the above equation and inserting an inverse transform/transform pair in front of the input segments, we can obtain:

$$T_1 y^k = \sum_{j=-s1}^{s2-1} T_1 H^j T_2^{-1} T_2 x^{k+j}$$

If we use $P^j$ to represent the matrix product $T_1 H^j T_2^{-1}$ (which can be calculated in advance), X to represent $T_2x$, and Y to represent $T_1Y$, then the above equation becomes $$Y^k = \sum_{j=-s1}^{s2-1} p^j X^{k+j}$$

Note that $T_1$ and $T_2$ can be the same transforms such as the DCT.

To extend to a two-dimensional separable filtering, the matrix-vector multiplication is changed to matrix-matrix multiplication with pre-matrices and post-matrices. The one dimensional matrix-vector multiplication equation becomes the two dimensional matrix-matrix multiplication equation:

$$y^{k,m} = \sum_{i=-s1}^{s2-1} \sum_{j=-t1}^{t2-1} H^i x^{k+i,m+j} W^j$$

where H represents vertical filtering (by column) and W represents horizontal filtering (by row). The equivalent operation in the transform domain is as follows:

$$T_1 y^{k,m} T_2 = \sum_{i=-s1}^{s2-1} \sum_{j=-t1}^{t2-1} (T_1 H^i T_3^{-1})(T_3 x^{k+i,m+j} T_4)(T_4^{-1} W^j T_2)$$

where $T_i$ can be any transform matrix. For example, in the DCT algorithm, $T_2$, $T_3^{-1}$, $T_4$ is the DCT transform matrix and $T_1 = T_2^t$. Thus, the transform-domain two dimensional filtering can be calculated as a summation of several matrix products Again the pre-matrices $T_1 H^i T_3^{-1}$ and post-matrices $T_4^{-1} W^j T_2$ can be calculated in advance.

Another important image manipulation technique is scaling. Scaling in the transform domain may be performed by a transform domain scaling unit.

Theoretically, scaling can be completed by linear filtering plus resampling. Each pixel in the final scaled image is a linear combination of all pixels in the original image. A simplified way to implement scaling is to use a box area averaging technique. Specifically, scaling with a rational factor, say p/q, simply maps q original pixel areas to p target pixel areas, where p and q are two integers without common factors greater than one. Therefore, each target pixel can be expressed as a linear combination of a limited number of original neighboring pixels, with the sum of weighting coefficients equal to one. For the one dimensional scaling operation, the relationship between the original pixels, x, and the new pixels, y, can be characterized by the one-dimensional matrix-vector multiplication equation, described earlier for one-dimensional linear filtering. Thus, using the same technique for transform-domain filtering, one can perform scaling in the transform domain.

By way of illustration, in a simple $\frac{1}{2} \times \frac{1}{2}$ down scaling, a new block can be computed as $H_1 B_{11} W_1 + H_2 B_{21} W_1 + H_1 B_{12} W_2 + H_2 B_{22} W_2$, where $B_{ij}$ are the original neighboring blocks, $H_i$ are the vertical scaling matrices, and $W_i$ are the horizontal scaling matrices. For example:

$$H_1 = \begin{bmatrix} 0.5 & 0.5 & 0 & 0 \\ 0 & 0 & 0.5 & 0.5 \\ 0 & 0 & 0 & 0 \\ 0 & 0 & 0 & 0 \end{bmatrix}$$

$$H_2 = \begin{bmatrix} 0 & 0 & 0 & 0 \\ 0 & 0 & 0 & 0 \\ 0.5 & 0.5 & 0 & 0 \\ 0 & 0 & 0.5 & 0.5 \end{bmatrix}$$

This equation is applicable for a block width of 4 pixels. Since these operations are linear, they may be performed in the DCT domain.

One skilled in the art will also recognize that the disclosed compositing techniques can be applied in general transform domains, like the DFT transform and the DST transform. In addition, the disclosed techniques may be used for image format conversion between different compression standards, such as between MPEG and JPEG.

One skilled in the art will recognize that the transform domain compositing operations, the transform domain decoding and encoding operations, and the other operations associated with the invention may be implemented by using standard hardware devices and programming techniques. FIG. 13 depicts an apparatus which may be used to execute the functions of the invention. The apparatus includes a central processing unit 70 which is coupled to a memory module 72. The memory module 72 may be any combination of RAM, ROM, and disc memory devices. The memory module 72 stores a number of programs for executing the operations of the invention. Specifically, the memory module 72 stores the execution units of the transform domain MC decoder 60: the inverse quantizer 34D, reference block calculator 61, and frame memory 63. The memory module 72 stores the execution units of the transform domain MC encoder 64: motion compensator 68 and frame memory 69. The memory module 72 also stores the execution units of the transform domain compositing unit 62: transform domain translator 67, transform domain overlap execution unit 80, transform domain pixel-wise multiplier 82, transform domain filter 84, and transform domain scaling unit 86.

The apparatus of FIG. 13 also includes known interface devices 74 to provide an interface between the digital processing elements (CPU 70, memory 72) and the video processing elements, such as transmission channel 28 and video display device 56B.

Now that the invention is fully disclosed, attention turns to peripheral issues surrounding implementation of the invention. The most complex operations in the transform domain are the transform domain MC encoding, transform domain MC decoding, and pixel-wise translation operations. The complexity primarily results from computing the block structure adjustment procedure. In the case of the transform domain MC encoding and decoding, if the non-zero motion vector percentages are decreased, computations can be reduced.

In the regular MC algorithm, the non-zero motion vector percentages vary with different video sequences. One way to reduce the non-zero motion vector percentages is to give some preference at the transmitter to the reference block with zero motion vectors in the MC algorithm. For example, instead of forcing the motion vector calculator 53 to search for the optimal reference block with the minimal block distortion, we can add a rule forcing the optimal reference block to have a block distortion value smaller than 80% of that for the zero-motion block (hereinafter the 80% MC approach). Otherwise, the zero-motion block is selected as the reference block.

Another possible technique to reduce the computational complexity in the DCT domain is to combine a sequence of operations into a single operation. For example, for MC/DCT compressed images, we may need to perform $F(DCT(e)+G(DCT(P_{ref})))$, where G represents the reference block calculation in 64, and F represents the scaling operation. Since they are both linear operations, we can apply the distributive law to change the above formula to $F(DCT(e))+H(DCT(P_{ref}))$, where H represents the composite function F*G. The computations for function F can be reduced since the non-zero coefficient percentage for DCT(e) is usually higher than that for the reconstructed image, e.g. $DCT(P_{ref})$.

The disclosed DCT-domain compositing approaches can reduce the required computations for DCT-compressed images by 60 to 75%. The required computations for MC-DCT compressed images may be reduced by 10 to 25%. The results depend on the compression ratios and the non-zero motion vector percentages. That is, the compositing throughput is variable from image to image. However, if constant-throughput video compositing is desired, one can skip the high-order DCT coefficients whenever the processing delay bound is exceeded. For example, in compositing MC/DCT compressed video, if the input video sequence has a very high percentage of non-zero motion vectors, one can simply process important low-order DCT coefficients in each DCT block and skip high-order DCT coefficients. By keeping low-order DCT coefficients, one can minimize the image quality loss.

The foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

We claim:

1. An apparatus for processing a first motion compensated transform domain video signal and a second motion compensated transform domain video signal, said apparatus comprising:
   an inverse motion compensating device performing inverse motion compensation on said first motion compensated transform domain video signal and said second motion compensated transform domain video signal to obtain a first transform domain video signal and a second transform domain video signal; and
   a compositing mechanism coupled to said inverse motion compensating device, said compositing mechanism performing transform domain video compositing operations on said first transform domain video signal and on said second transform domain video signal to obtain a transform domain composited video signal.

2. The apparatus of claim 1 wherein said inverse motion compensating device includes a reference block calculator for generating an inverse motion compensated transform domain signal corresponding to said first motion compensated transform domain video signal.

3. The apparatus of claim 2 further comprising:
   a transform domain object translator for calculating non-grid aligned reference blocks within a grid of a first video frame of said first transform domain video signal to obtain a grid aligned current block in a grid of a second video frame of said first transform domain video signal.

4. The apparatus of claim 1 further comprising:
   a motion compensator for transforming said transform domain composited video signal to a motion compensated transform domain composited video signal.

5. The apparatus of claim 1 wherein said compositing mechanism includes:
   a compositing unit object translator for matching a grid aligned block of a first video frame with a block of a second video frame.

6. The apparatus of claim 1 wherein said compositing mechanism includes:
   an overlap execution unit for positioning a first video object from a frame of said first transform domain video signal over a second video object from a frame of said second transform domain video signal.

7. The apparatus of claim 1 wherein said compositing mechanism includes:
   a pixel-wise multiplier to execute pixel multiplication between pixels within a frame of said first transform domain video signal and pixels within a frame of said second transform domain video signal.

8. The apparatus of claim 1 wherein said compositing mechanism includes:
   a filter for performing filtering operations on said first transform domain video signal and on said second transform domain video signal.

9. The apparatus of claim 1 wherein said compositing mechanism includes:
   a scaling unit for adjusting the size of image objects in said transform domain composited video signal.

10. A method of processing a first video signal and a second video signal to form a single composited video signal, said method comprising the steps of:
    encoding said first video signal at a first location to form a first motion compensated transform domain video signal;
    encoding said second video signal at a second location to form a second motion compensated transform domain video signal;
    transmitting said first motion compensated transform domain video signal to a third location;
    transmitting said second motion compensated transform domain video signal to said third location;
    executing an inverse motion compensating operation at said third location to obtain a first transform domain video signal and a second transform domain video signal; and
    performing transform domain video compositing operations on said first transform domain video signal and on said second transform domain video signal to obtain a transform domain composited video signal.

11. The method of claim 10 further comprising the step of:

encoding said transform domain composited video signal to form a motion compensated transform domain composed video signal; and transmitting said motion compensated transform domain composited video signal to a fourth location.

12. The method of claim 11 further comprising the step of effecting an inverse transform domain operation and an inverse motion compensation operation on said motion compensated transform domain composited video signal to yield a reconstructed composited video signal; and displaying said reconstructed composited video signal.

13. An apparatus for processing a first motion compensated transform domain video signal and a second motion compensated transform domain video signal, said apparatus comprising:

an inverse motion compensating device performing inverse motion compensation on said first motion compensated transform domain video signal and said second motion compensated transform domain video signal to obtain a first transform domain video signal and a second transform domain video signal, said inverse motion compensating device including a transform domain object translator for calculating non-grid aligned reference blocks within a grid of a first video frame of said first transform domain video signal to render a grid aligned current block in a grid of a second video frame of said first transform domain video signal; and a compositing mechanism coupled to said inverse motion compensating device, said compositing mechanism performing transform domain video compositing operations on said first transform domain video signal and on said second transform domain video signal to obtain a transform domain composited video signal.

14. The apparatus of claim 13 wherein said first motion compensated transform domain video signal is a first Motion Compensated/Discrete Cosine Transform (MC/DCT) video signal and said second motion compensated transform domain video signal is a second MC/DCT video signal.

15. The apparatus of claim 14 wherein said transform domain object translator generates DCT coefficients for said non-grid aligned reference blocks based upon DCT coefficients of corresponding adjacent grid-aligned blocks encompassing each of said non-grid aligned reference blocks.

16. The apparatus of claim 13 further comprising:

a motion compensator for transforming said transform domain composited video signal to a motion compensated transform domain composited video signal.

17. The apparatus of claim 16 wherein said motion compensator includes a transform domain object translator for calculating non-grid aligned reference blocks within a grid of a first video frame of said first transform domain video signal to obtain a grid aligned current block in a grid of a second video frame of said first transform domain video signal.

18. The apparatus of claim 13 wherein said compositing mechanism includes:

a compositing unit object translator for matching a grid aligned block of a first video frame with a block of a second video frame.

19. The apparatus of claim 13 wherein said compositing mechanism includes:

an overlap execution unit for positioning a first video object from a frame of said first transform domain video signal over a second video object from a frame of said second transform domain video signal.

20. The apparatus of claim 13 wherein said compositing mechanism includes:

a pixel-wise multiplier to execute pixel multiplication between pixels within a frame of said first transform domain video signal and pixels within a frame of said second transform domain video signal.

21. The apparatus of claim 13 wherein said compositing mechanism includes:

a filter for performing filtering operations on said first transform domain video signal and on said second transform domain video signal.

22. The apparatus of claim 13 wherein said compositing mechanism includes:

a scaling unit for adjusting the size of image objects in said transform domain composited video signal.

* * * * *